United States Patent [19]
Williamson, Jr.

[11] 3,930,198
[45] Dec. 30, 1975

[54] BATTERY TESTER AND CIRCUIT

[75] Inventor: Richard P. Williamson, Jr., Winchester, Mass.

[73] Assignee: Polaroid Corporation, Cambridge, Mass.

[22] Filed: Oct. 21, 1974

[21] Appl. No.: 516,644

[52] U.S. Cl. .................. 324/29.5; 320/48; 340/249
[51] Int. Cl.² ......................................... G01N 27/42
[58] Field of Search .................. 320/2, 48; 340/249; 324/29.5

[56] References Cited
UNITED STATES PATENTS

| | | | |
|---|---|---|---|
| 3,529,230 | 9/1970 | Tedd | 320/48 |
| 3,680,072 | 7/1972 | Charbonnier et al. | 324/29.5 |
| 3,835,362 | 9/1974 | Greene | 320/48 |
| 3,841,336 | 10/1974 | Daynard | 320/48 |
| 3,877,001 | 4/1975 | Bogut et al. | 340/249 |

*Primary Examiner*—John Kominski
*Attorney, Agent, or Firm*—Gerald L. Smith

[57] ABSTRACT

Apparatus for performing an in situ testing of the condition of a battery positioned within a sealed multihyphened walled package suited for retail distribution, which battery may form a component of a composite photographic film ladened cassette assemblage. Upon positioning the package within a receiving arrangement, relative movement is provided between the package and a pair of testing probes which penetrate the package and contact terminal defining surfaces of the battery. Utilizing the tested battery itself as a power supply, an evaluation of internal impedance and voltage characteristics is made for a limited sampling interval. At the conclusion of this interval, a comparator arrangement evaluates the level of sampled voltage and selectively illuminates an indicator, for instance, a light emitting diode. Drawing dismissible power from the battery at the conclusion of the sampling interval, the (L.E.D.) remains energized until the package is released from the test apparatus.

17 Claims, 7 Drawing Figures

BATTERY TESTER AND CIRCUIT

BACKGROUND OF THE INVENTION

This invention relates to battery status evaluation devices and, more particularly, to an arrangement for the in situ testing of batteries packaged within a container suited for distribution through retail outlets.

U.S. Pat. Nos. 3,705,542; 3,543,662; 3,543,663; and 3,595,661 relate to photographic film cassettes which comprise a discardable container enclosing self-developing film units in combination with a battery power supply system. Essentially, the cassette structure described in those patents comprises an opaque enclosure or cassette containing a grouping of components including a dark slide for covering an exposure station in a forward wall of the container; a stack of individual, "self-developing" film units positioned behind the dark slide; means for urging the stack of film units toward the forward wall to position the uppermost film unit of the stack in the exposure station and an electrical power supply in the form of a flat battery which is held against the internal side of the opposite or rear wall of the enclosure. The battery is structured having terminal defining metallic surfaces in adjacency with appropriate apertures or openings formed within the noted rear wall of the enclosure. The composite, film-power supply cassette may be employed in a photographic camera, for instance, similar to that sold by Polaroid Corporation of Cambridge, Massachusetts, U.S.A., under the trade name "SX-70." When the cassette structure is inserted within the camera, a fresh supply of power is provided for operating the electrical powered mechanisms thereof to carry out a series of photographic cycles corresponding with the number of film units in the cassette. Electrical communication between the camera and the noted terminals of the battery is provided upon full insertion of the cassette within the camera, spring biased electrical contact members coming into contact with these terminal surfaces as the cassette becomes fully seated within the receiving chamber of the camera.

A photographic cycle for the camera involves a somewhat complex series of operational events each imposing electrical power demands and each being controlled by an integrated solid state control circuit. As detailed in U.S. Pat. No. 3,774,516, this control circuit monitors several mechanical manipulations of the instrumentalities of the device involving a dual energization of a d.c. dynamo-electric motor as disclosed in U.S. Pat Nos. 3,811,081 and 3,731,608 as well as a select multiple energization of exposure regulating tractive electromagnetic drives as described, inter alia, in U.S. Pat. Nos. 3,791,278; 3,750,543; 3,805,204 and 3,820,128. The operational events carried out by the camera include those of securing an exposure chamber, reflex optical path conversion, automatic regulation of the exposure of the film unit, motor driven film unit removal and processing as well as removal of the above-noted dark slide positioned at the exposure station of the cassette.

The flat type battery powering the camera throughout the above series of operational events is ideally suited to meet the requirements of the control system of the camera. For instance, the battery power supply is required to exhibit a low internal impedance while remaining capable of providing a relatively high current output in addition to having a multi-cycle capacity.

During its powering activity in the course of a photographic cycle, the flat battery is called upon to maintain predetermined voltage levels required for operating integrated logic control circuits. Accordingly, it is important that the film and battery containing cassettes be delivered to the using public having battery power supplies of proper operational capacity. Generally, such determinations of proper capacity are provided by factory testing the batteries, for instance, for requisite threshold values of closed-circuit voltage. Such factory testing is carried out by momentarily imposing a predetermined load across the noted terminals thereof for a short, predetermined interval. Those batteries meeting the requirements of the test are inserted within the cassette along with film units and the like and the composite assemblage then is packaged within an enclosure having outer cardboard supporting walls and an internally disposed hermetic seal. The package then is ready for retail marketing.

The flat or planar batteries incorporated within the film cassette preferably are primary batteries of the LeClanche type including a zinc anode system, a manganese dioxide cathode system and an aqueous electrolyte of ammonium chloride, zinc chloride and, usually, a small amount of mercuric chloride. Such batteries have been observed to require storage conditions which ideally correspond with those of the film units incorporated within the cassette. For instance, they preferably are maintained at lower temperatures and within an environment protected from vapor attack and the like. However, while these storage condition requirements may be complementary, it has been found that the shelf-like characteristics of the battery structures from one production run to another may vary such that certain numbers of them will exhibit a shelf life falling below that of the corresponding shelf life of the film with which they are associated. Where the shelf life of the composite film power supply assemblage is confined to lowest statistically determined shelf life of the battery units therewithin, undue wastage of valuable film as well as battery products may result. Accordingly, it is desirable to provide an evaluation technique accurately reflecting the actual state of the power supply of each film-power supply package.

SUMMARY OF THE INVENTION

The present invention is addressed to an arrangement for testing the operational suitability of batteries incorporated within a package suited for retail distribution, for instance, a package incorporating a film cassette having a self-contained battery power supply. Such testing is carried out in situ without destruction of the structural integrity of the cardboard or equivalent material utilized to form the package, as well as without producing deleterious effects in battery performance. Accordingly, with the arrangement of the invention, the product shelf-life characteristics of a composite film-battery power supply cassette may be evaluated at a more optimum point in the life span of the product.

Specifically, the containers within which such composite structures are packaged are provided having a rectangular parallelepiped configuration, the major dimension of which covers the corresponding major dimension of the cassette structure and the minor dimension or height of which surrounds the side walls of the cassette. Access to the internal portion or an internally disposed cavity within the outer container may be effected by an initial penetration of the side walls thereof of minor dimension by substantially nondestructive test probes. Inasmuch as a functional taper generally is imparted to the noted composite cassette structure, tolerances are available for the mechanism providing for penetration by the probes within the cassette retaining container. Accordingly, insertion of the container is provided in a manner wherein substantially no opportunities for damage to the cassette are present.

The invention features an arrangement wherein the battery being tested, itself, serves to power the logic components of a test circuit without imposing deleterious power drains. In this regard, once appropriate probe contact with the terminals of a battery is made, a short sampling interval is commenced to evaluate internal impedance characteristics and the like by derivation of closed-circuit voltage utilizing a predetermined load imposed across the battery terminals. The test circuit is not enabled until assurance is provided that no deleterious relative motion, i.e. of a variety generating spurious signals, exists between contacting probes and the terminal defining surfaces of a battery under tests. As a consequence, no adverse noise effects or the like will be encountered to impair the measurement of closedcircuit voltage.

At the termination of a sampling interval, the testing circuit of the invention operates to gate the sample closed-circuit voltage level while, simultaneously, evaluating its level with respect to a predetermined standard. To achieve appropriate comparison utilizing the battery source itself as a comparator drive, a voltage regulation feature is provided. Once the noted evaluation is carried out, an indicator, for instance in the form of a light emitting diode (L.E.D.) is energized to apprise the operator of the condition of the battery. In a preferred arrangement, only one such L.E.D. is energized for the purpose of indicating a battery meeting requisite power standards. Alternately, two such indicators may be utilized, one to provide for an indication of a battery evidencing a closed circuit voltage falling below the predetermined standard and the other to show a battery having an adequate power characteristic. Inasmuch as the sampling interval is terminated at such time as the indicators are energized, battery drain is minimized, the L.E.D. indicators requiring a dismissible power input from the battery. The circuit is de-energized when the operator releases a test actuating lever, thereby rapidly opening the noted probe position responsive features.

Other objects of the invention will in part be obvious and will in part appear hereinafter.

The invention accordingly comprises the apparatus possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION OF THE DRAWINGS

Figure 1:
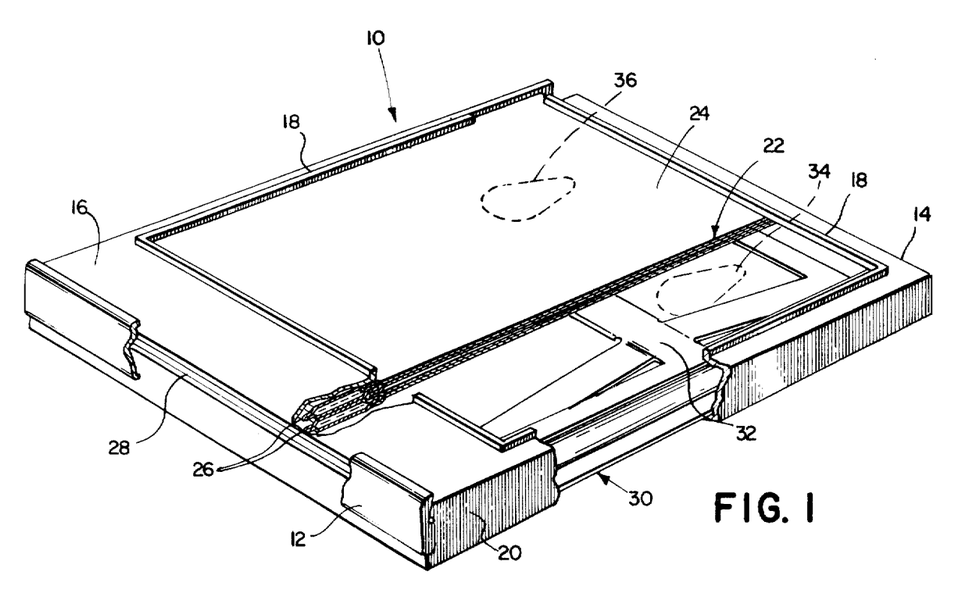
FIG. 1 is a perspective view of a photographic film cassette incorporating a planar primary battery, portions of the view being cut away to reveal internal structure.

Referring to FIG. 1, a composite photographic film cassette, the battery component of which may be tested utilizing the apparatus of the invention, is revealed in perspective. The cassette generally is formed to taper somewhat from its forward wall 12 to the rear wall 14 thereof. The top surface or wall 16 of cassette 10 is formed having an exposure access opening defined by a ridge 18 formed integrally therein. One side wall having a tapering dimension between forward wall 12 and rear wall 14 is shown at 20. Located beneath top surface or wall 16 is a stacked supply of film units, shown generally at 22.

Each of these film units, as stacked at 22, is of a "self-developing" variety, sometimes described as an integral negative-positive film unit having as essential elements, a photosensitive element having a photosensitive system for providing a diffusion transfer image pattern, an image-receiving element, an opacification system and a rupturable container holding a processing composition. In the drawings, the photosensitive portions of the film units are represented generally at 24, while the pods or rupturable containers holding processing solution are represented at 26. Generally, a full film supply for the composite cassette 10 will amount to a stack of ten individual film units. Prior to use, a dark slide (not shown) is positioned over the uppermost film unit to preclude the passage of actinic radiation through the exposure opening defined by ridge 18. The dark slide is removed as an initial operational event in the positioning and locking of the cassette structure within a camera.

The elements of the film units as at 24 are integrated such that upon distribution of processing composition within an exposed unit, a diffusion transfer image is derived in the image-receiving element which is viewable against a reflective background without separation procedures or the like. The film units are adapted for processing outside a camera within which they are exposed, since effective protection against further exposure is provided by way of the opacification which, in some integral negative-positive film units, is integrated with the unit prior to exposure of photosensitive system while, in another, the opacification system is integrated with the system after exposure. In the preferred integral negative-positive film units the opacification system comprises a combination of light-absorbing dyes and a light-reflecting material or pigment and this combination is included in the rupturable container and distributed between the photosensitive and image-receiving elements after exposure. Further details relative to the integral negative-positive film units may be found in U.S. Pat. Nos. 3,415,644; 3,415,645; 3,415,646 and 3,647,437, among others. Upon stacking, the pods as at 26 require a greater stacking height than the remaining portions of the integral film units. Essentially for this reason, the noted taper is present along the general front to back structure of the cassette.

Leading or forward wall 12 is formed having a generally rectangular slot or exit orifice 28 which serves as a passage through which exposed uppermost ones of the film units at 24 may be individually withdrawn. A flap 29 covers this slot prior to insertion of the cassette within a camera.

The battery of the composite cassette 10 is positioned on the lower interior surface thereof and is shown generally at 30. As disclosed in the aforementioned U.S. Pat. No. 3,543,662, cassette 10 additionally includes a spring loaded platform 32 positioned intermediate the lowermost one of the film units at 24 and the upward facing surface of battery 30. Platform 32 serves to compressively retain battery 30 and the lower facing terminal surfaces thereof in aligned adjacency against terminal openings shown in phantom at 34 and 36 and formed within the lower or bottom wall of cassette 10. These openings are located so as to permit contact between terminal defining surfaces of the battery 30 and appropriate spring-biased power supply contacts of the camera. In normal usage, following exhaustion of all film units at 24 within the cassette structure, the assembly, including battery 30, is discarded.

Figure 2:
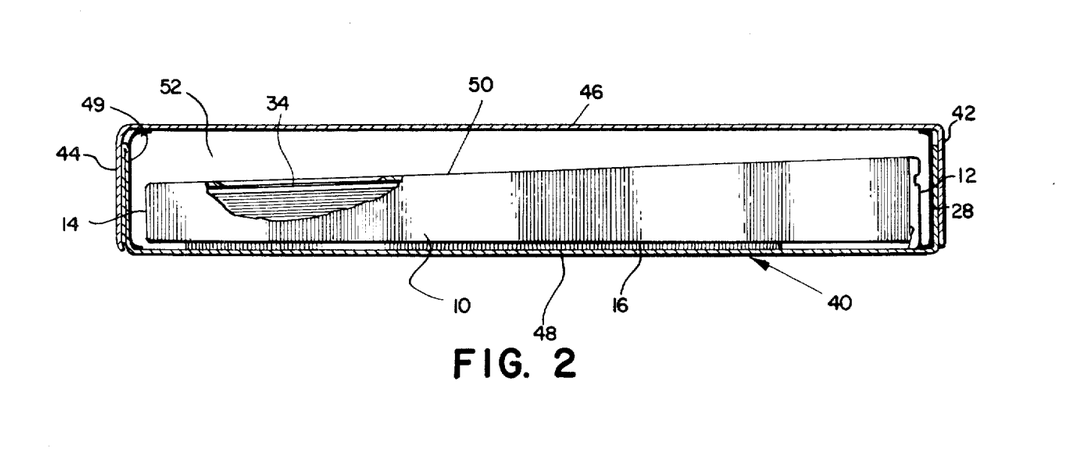
FIG. 2 is a sectional view of the composite cassette structure of FIG. 1 showing, in partial section, its orientation within a protective package.

Looking to FIG. 2, the orientation of cassette 10 within a container or package suited for retail marketing is revealed generally as a package assemblage 40. The outer package around composite cassette 10 may assume a variety of configurations and be formed of any of a variety of suitable materials, for instance, cardboard. For the instant purposes, the container is shown as a rectangular parallelepiped having end walls 42 and 44 and top and bottom walls shown, respectively, at 46 and 48. A hermetic seal 49 is provided about all internal surfaces of the package. Note that top wall 46 extends over the bottom wall of cassette 10, now shown at 50. With this arrangement, the terminal openings at 34 and 36 within bottom wall 50 of cassette 10 face upwardly toward top wall 46 of the container. Further, the tapered dimension of cassette 10 as it extends from forward wall 12 to rearward wall 14, provides for the presence of a cavity or open or free volume portion 52 intermediate the rearward portion of cassette 10 and the internal surface of wall 46 of the container. It is this free volume within the package assemblage 40 which is penetrated for purposes of testing the power supply status of battery 30.

Figure 3:
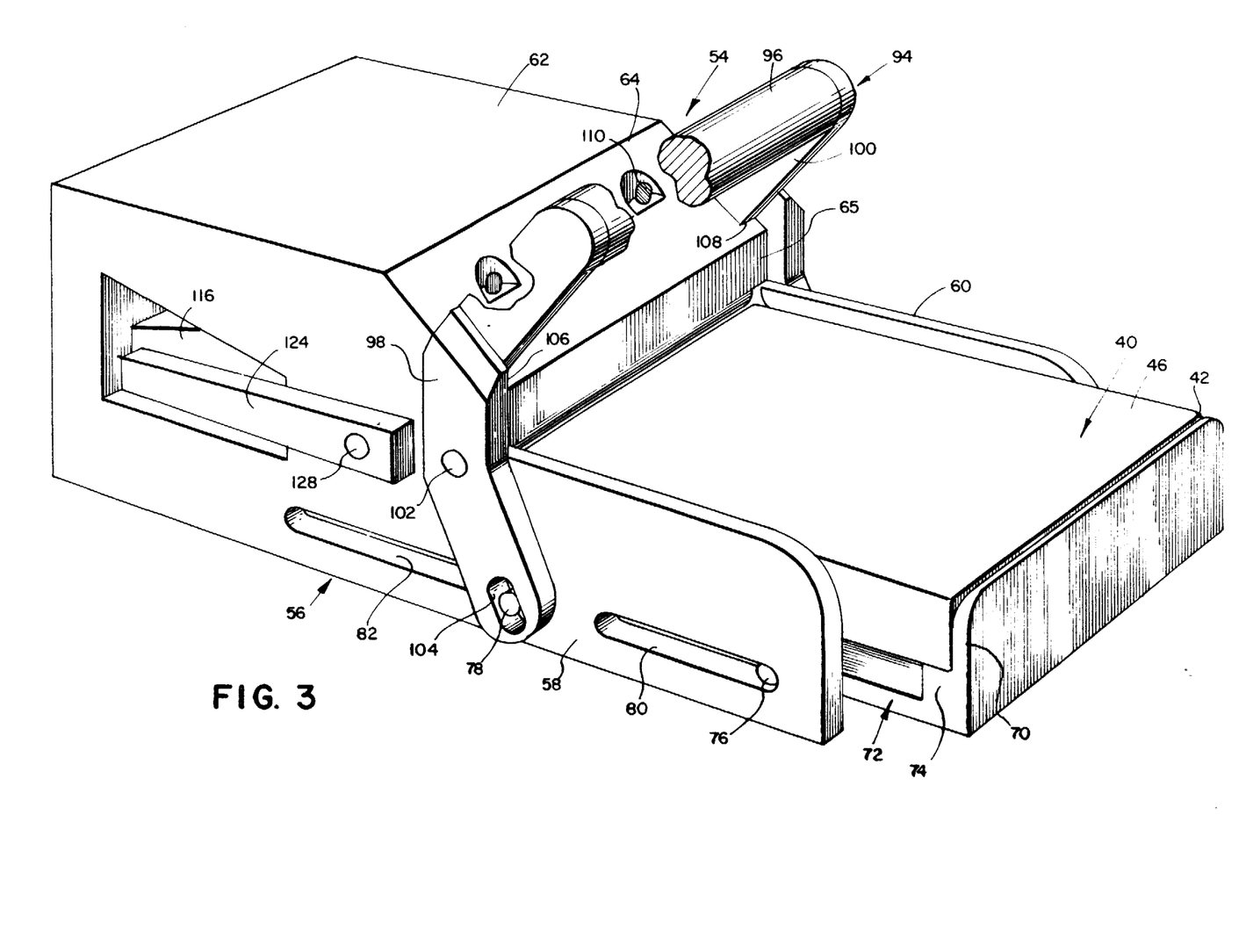
FIG. 3 is a perspective view of apparatus incorporating features of the invention showing the orientation of a packaged composite film-battery package preparatory to the testing of the battery therewithin.

Referring to FIG. 3, the apparatus for testing this packaged assembly 40 is revealed generally at 54. Testing apparatus 54 includes a basic support structure 56 formed having side walls 58 and 60 along the top walls 62 and 64, and forward wall 65.

Figure 4:
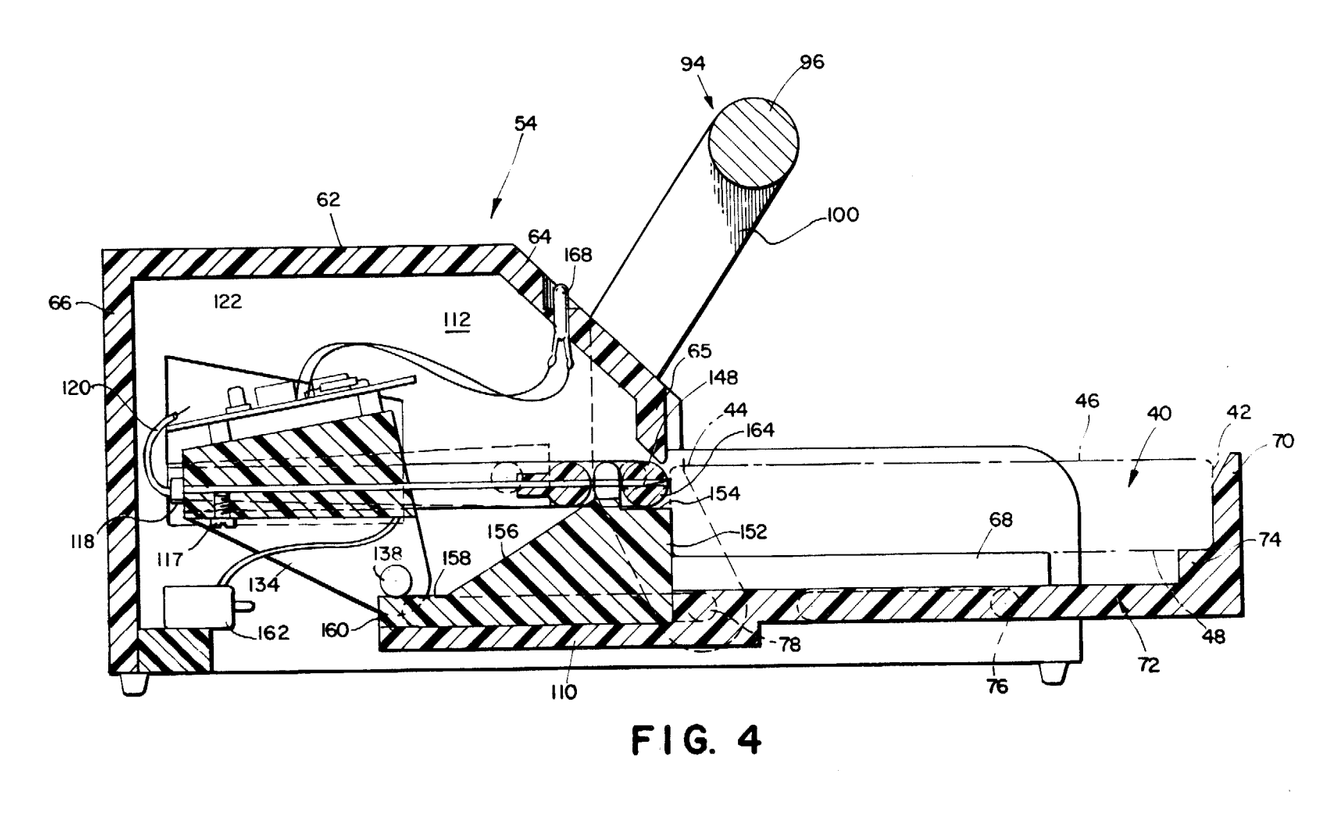
FIG. 4 is a sectional view of the apparatus of FIG. 3 showing the orientations of the components thereof prior to the evaluation of a battery located within a packaged composite cassette.
Figure 5:
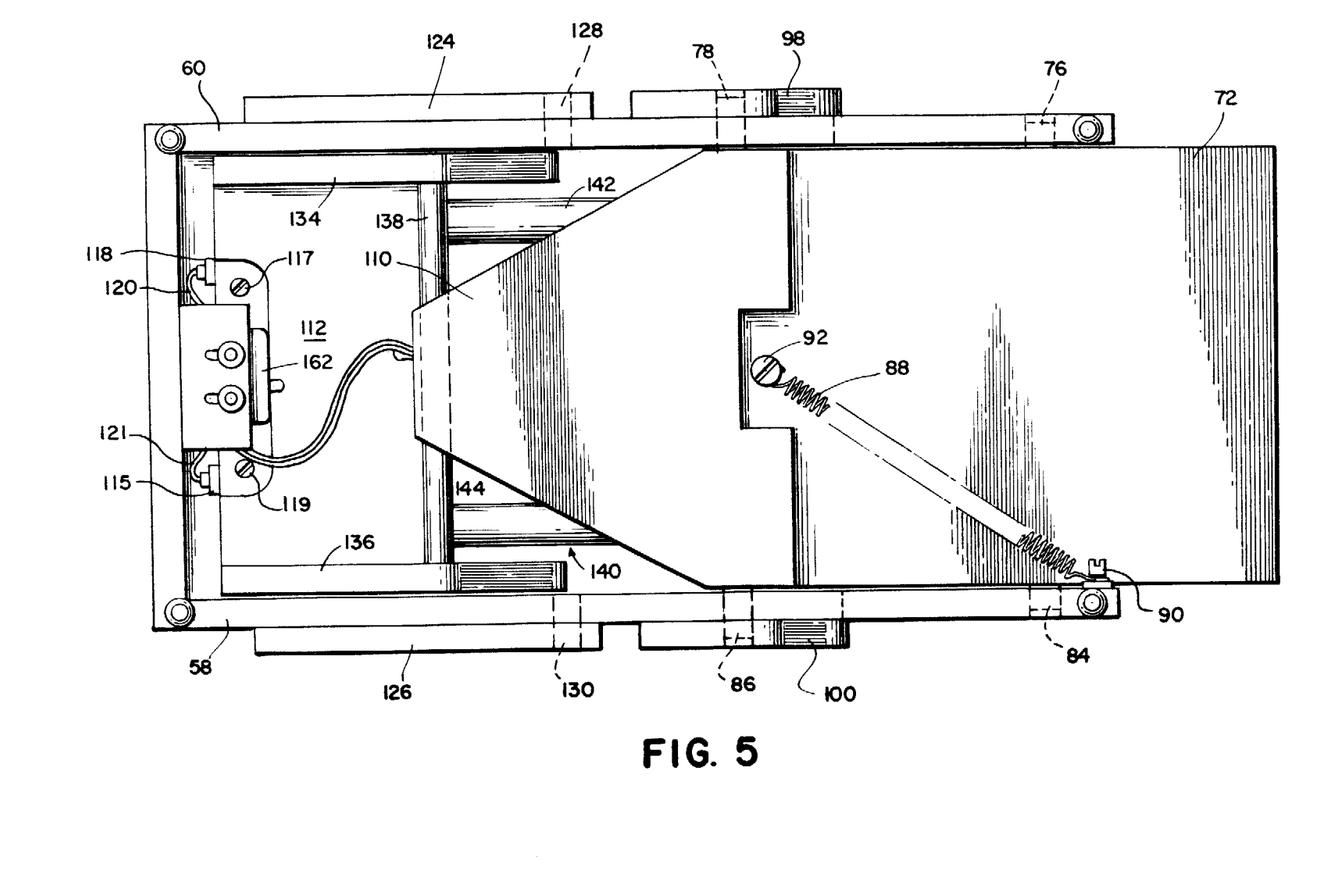
FIG. 5 is a bottom view of the apparatus of FIG. 3.

Referring additionally to FIGS. 4 and 5, positioned intermediate walls 58 and 60 at the forward end of the device is a supporting platform 58 which is adapted to slidably receive bottom wall or side 48 of the package or film assemblage 40. As is apparent from the figures, when the film package 40 is positioned within the receiving chamber, or area defined by walls 58 and 60 and supporting platform 68, the assembly 40 is oriented for appropriate insertion within the testing apparatus 54. Further defining this receiving chamber or portion, when the apparatus 54 is in the orientation shown at FIGS. 3 and 4, a wall 70 of a carriage assembly 72 nests against package wall 42. A rectangular seating filet 74 is provided forwardly of rear wall 70 to provide a seating surface for the end portion of container 46. In this regard, the upper surface of filet 74 is coplanar with the upper supporting surface of platform 68.

Carriage assembly 72 is mounted for slidable movement toward and within that portion of apparatus 54 covered by walls 62, 64 and 65. Such mounting is provided by the slidable mounting of pins as at 76 and 78 fixed to and extending from carriage 72 and slidably mounted within corresponding slots shown, respectively, at 80 and 82 formed within wall 58. As shown in FIG. 5, an identical mounting is provided on the opposite side of apparatus 54 by pins 84 and 86 extending through the slots corresponding with those depicted at 80 and 82. As further depicted in the same figure, carriage assembly 72 is biased for movement outwardly to assume the orientation shown in FIGS. 3 and 4 by a spirally wound spring 88 extending between mounting screw 90 attached to wall 58 and mounting screw 92 attached to the under side of carriage assembly 72.

Returning to FIGS. 3 and 4, apparatus 54 also is seen to include a hand actuated lever, shown generally at 94, formed having a cylindrical grip 96, the ends of which are fixed to levers 98 and 100. It may be desirable to design the lever arrangement 94 such that the operator is encouraged to push it downwardly from the top as opposed to grasp it. With such an arrangement, the operator would be encouraged not to curl his fingers or thumb around the grasping portion 96 such that an interference with film package 40 in the fully downward position would be encountered. Levers 98 and 100 are journaled for pivotal movement over pins extending, respectively, from side walls 58 and 60. In this regard, such a pin 102 is shown in FIG. 3 extending from wall 58. The lowermost portion of each of levers 98 and 100 is slidably connected to carriage assembly 72 by pin and slot connections, one slot of which is shown at 104 engaging extended pin 78. A pin 86 depending from carriage assembly 72 engages an appointed slot (not shown) in lever 100. The slots as at 104 are elongate in configuration to accommodate for pivotal movement of the hand actuated lever assembly 94. The upward travel of lever assembly 94 is limited by the configuration of its levers 98 and 100. Note in this regard, that the levers are formed having seating surfaces as at 106 and 108 which abut against top wall 64 of the apparatus 54. Alternatively, the slots as at 80 or 82 may be configured to limit the motion of the carriage assembly 72 which, as noted above, is coupled with the lower tip portions of levers 98 and 100. The lever 94 is biased into such abutting contact with top wall 64 in consequence of the tension of spring 88 urging carriage assembly 72 into the orientation of FIGS. 3 and 4 which, in turn, translates such directional bias through pins 78 and 86.

On the proper insertion of a film package 40 as shown in FIGS. 3 and 4, the cylindrical grip 96 of hand actuated lever 94 is grasped by the operator and, with a simple one-handed motion, the lever is pivoted about pins as at 102 in a downward direction to, in turn, drive carriage assembly 72 inward by virtue of its connection with assembly 94 at pins 78 and 86. The film package 40 now slides inwardly into the rearward and protected portion of the apparatus as defined by rear wall 66, top walls 62, 64 and 65 and the inner rearward portion of side walls 58 and 60. Note that the bottom edge of wall 65 assumes the vertical positioning of package 40. The chamber defined by the noted walls is identified by the numeral 112.

As is revealed in FIG. 4, chamber 112 contains two metal probes or contact members, one of which is revealed at 114, which are coplanar, parallel and mutually spaced such that, when injected through the top portion of end wall 44 of the package assembly 40, they are aligned for ultimate contact with the terminal electrode surfaces of battery 30 lying beneath openings 34 and 36 of cassette 10. The probes, as at 114, are fixedly mounted to and extend from the rearward portion of a tilt block 116. For this mounting, set screws 117 and 119 are provided. Inasmuch as the inner lining as at 49 of the film assemblage may be formed as a foil or similarly electrically conductive material, it is necessary to electrically insulate those portions of the surfaces of the probes which abut against the penetrated foil. Such insulation may, for instance, be provided as a polymeric or epoxy coating over the cylindrical surfaces of the probes. Of course, other suitable and wear resistant materials may be incorporated in structuring the probe members. A corrosion resistant quality for the coating also may be found desirable. Connection between the probes as at 114 with the tilt block 116 is provided by collet connectors shown at 118 and 115 (FIG. 5). Connectors as at 118 and 115 are fixed both to tilt block 116 and the appropriate probes and are electrically conductive for providing communication, respectively, as by leads 120 and 121 to a circuit board shown generally at 122. As is revealed more clearly in FIGS. 3 and 5, each respective side of tilt block 116 is fixedly mounted to a pivotal bar or lever 124 and 126. Levers 124 and 126, in turn, are pivotally mounted to side walls 58 and 60 through pins 124 and 130. As will be revealed in more detail later herein, the positioning of the pivot point for levers 124 and 126 is important to the design of the apparatus. More particularly, this pivot point is selected as being present at that location represented by forward wall 44 of the package 40 when the angle of attack of probes as at 114 is altered to effect the contact thereof with corresponding terminal defining surfaces of the battery.

Looking in more detail to the shape of tilt block 116, note that it is formed having a more or less solid central portion surmounted on each side by two downwardly extending side protrusions as at 134 and 136. These protrusions serve to support a cam follower rod 138 which extends transversely across the assembly. It will be apparent that, by driving rod 134 upwardly, the entire tilt block assembly will pivot about pins 128 and 130.

Figure 6:
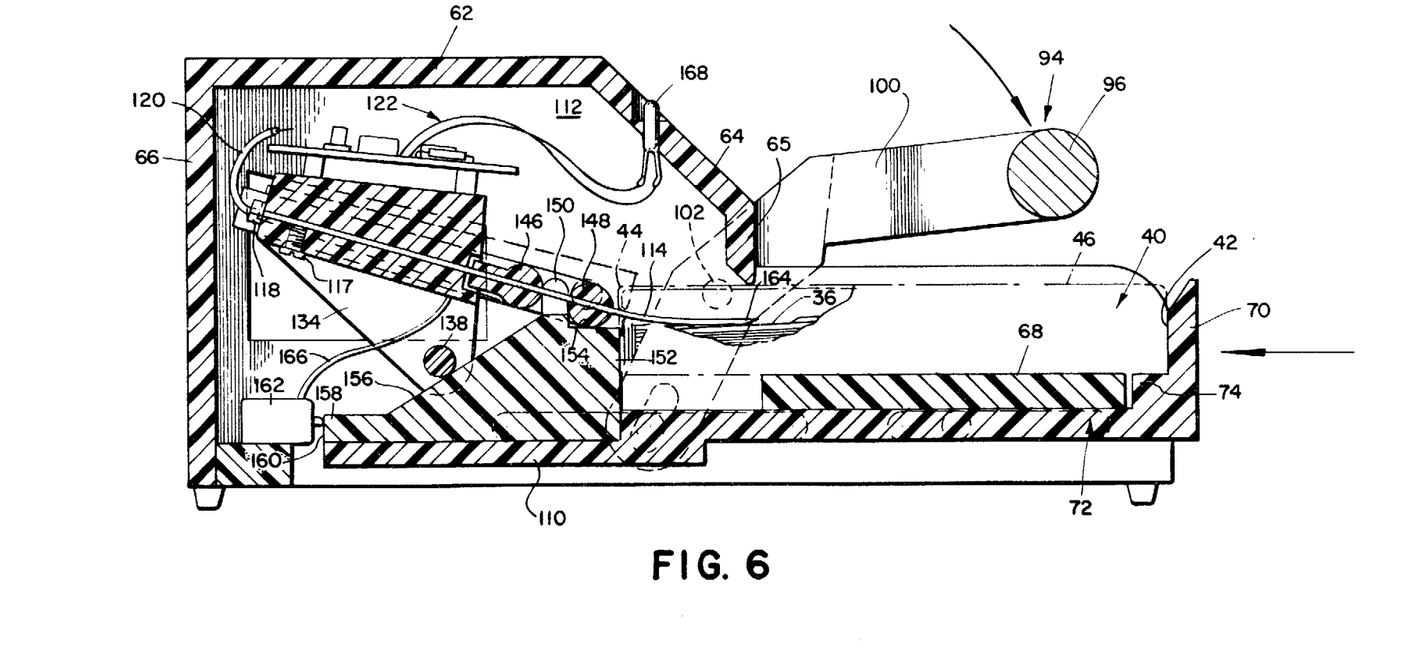
FIG. 6 is a sectional view of the apparatus of FIG. 3 showing the orientation of the components thereof during an interval of battery testing.

The battery testing probes as at 114 are supported substantially throughout their length by a slider support bracket depicted generally at 140. Bracket 140 is formed having two cylindrical probe support members which are slidably mounted within and supported from tilt block 116. Further, members 142 and 144 are formed having an internal bore within which probes as at 114 are mounted. The forward portions of support members 142 and 144 are joined together by spaced cylindrical cross supports 146 and 148 (FIGS. 4 and 6). Cross supports 146 and 148 are so mutually spaced as to form a very loose pivot connection with upstanding protrusion 150 extending from a cam block 152. Block 152 is formed having a horizontally disposed surface 154 formed beneath the lowermost portion of cross support 148, a cam rising profile surface or stage 156 and cam dwell surface or stage 158. Block 152 is fixed to the extended portion 110 of carriage 72 and is elevated thereabove a distance sufficient to provide a vertical actuating surface 160 which serves to trip a microswitch 162 upon movement of carriage assembly 72 to its rearwardmost or limiting position.

Looking to FIG. 4, as hand actuated lever 94 is pulled downwardly, carriage 72 commences to move inwardly in consequence of its connection with levers 98 and 100. Accordingly, package 40 is driven over the top surface of supporting platform 68 under wall 65 and in alignment with side walls 58 and 60 by carriage wall 70. Simultaneously, cam block 152 is moved rearwardly such that its dwell portion 158 slides beneath follower rod 138. Upstanding protrusion 150 engages cross support 146 to drive slider support bracket 140 rearwardly into receiving bores within tilt block 116. Accordingly, the forward portion or tips of the probes as at 114 become exposed. One such tip portion is revealed at 164. While cam follower rod 138 rides upon dwell portion 158 of cam block 152, the probes as at 114 will retain a substantially horizontal orientation and will penetrate the top region of rear wall 44 of the assemblage or package 40. As described in conjunction with FIG. 2, this uppermost portion of wall 44 opens to a cavity or clear space 52 above the cassette structure 30. Note that broad tolerances are available for this initial penetration and that the substantially horizontal orientation of the penetrating probes assures no inadvertent contact with the walls as at 14 of cassette 30, as well as provides a more stable compressive stress arrangement for the probes.

Looking additionally to FIG. 6, as cam follower rod 138 contacts rising profile portion or stage 156 of cam block 152, tilt block 116 pivots about pins 128 and 130 by virtue of its coupling therewith through levers 124 and 126 to commence to alter the angle of attack of the probes as at 114. As noted earlier, this alteration of the angular attack of the probes takes place about a pivot point defined by forward wall 44 of the package 40 as it is now oriented within the apparatus. Recall at this juncture, that pins 128 and 130 of the assembly were located to provide for this point of angular alteration of the probes. With the arrangement, no undue strains are exerted upon forward wall 44 or the mechanism inserting the probes within the package assembly 40, inasmuch as the coupling between cross supports 146 and 148 with protrusion 150 is very loose. Accordingly, the noted particular location of the pivot point for altering the angle of attack is accommodated for. It further may be noted that surface 154 of tilt block 116 is located so as not to interfere with cross support 148 during the pivoting activity.

The probe members, having entered chamber 58, take on a downward arcuate movement and approach the terminal defining surfaces of battery 30. Accordingly, contact with the terminal surfaces is made with a gentle downward and slightly sliding motion. No damage is occasioned at the terminal surfaces. It may be noted from FIG. 4 that the tip as at 164 of the probe as at 114 is shaped so as to provide an upwardly disposed point for insertion within end wall 44 and a taper depending therefrom to improve its angle of attack at the battery terminal surface.

Of course, other appropriate tip shapes may be utilized. For instance, a bullet shaped tip portion will be operative for the intended purpose. When the tips of the probes as at 114 make contact with the terminal defining surfaces of the battery within the assembly 40, a modicum of compliance at the terminal surface is provided which permits the surface to depress slightly. Recall from the description of the cassette structure 10 in FIG. 1 that a spring platten 32 resides intermediate the stacked film assembledge 22 and battery structure 30. With this compliant nature of the structure factored into the instant design, assurance of proper electrical contact is realized.

As carriage 72 is driven to approach its limiting rearward orientation, surface 160 of cam block 152 strikes the contact of a microswitch 162. This switch, acting through leads as at 166, serves to activate the battery test control circuit at 122. Inasmuch as a sliding and full electrical contact will have been effected between the terminal surfaces of the battery and the probes as at 114, the actuation of switch 162 takes place at a point in time appropriate to activate a testing circuitry. For instance, should the circuit be activated simultaneously with initial probe contact at the battery, spurious noise signals and the like adversely affecting the measuring technique may be encountered. In the presence of a battery not having an adequate value for closed circuit voltage (C.C.V.), an indicator lamp, present for instance, as a light-emitting diode (L.E.D.) as at 168 will be illuminated to apprise the operator of the presence of the poor battery. As shown in FIG. 1, dual indicator lamps as at 168 and 170 may be utilized with the device, one lamp 170, apprising the operator of the presence of a good battery, the other lamp apprising of the presence of a battery not exhibiting an adequate closed circuit voltage threshold value. It will be apparent that only one lamp, that showing the presence of a good battery, need be utilized with the device.

Figure 7:
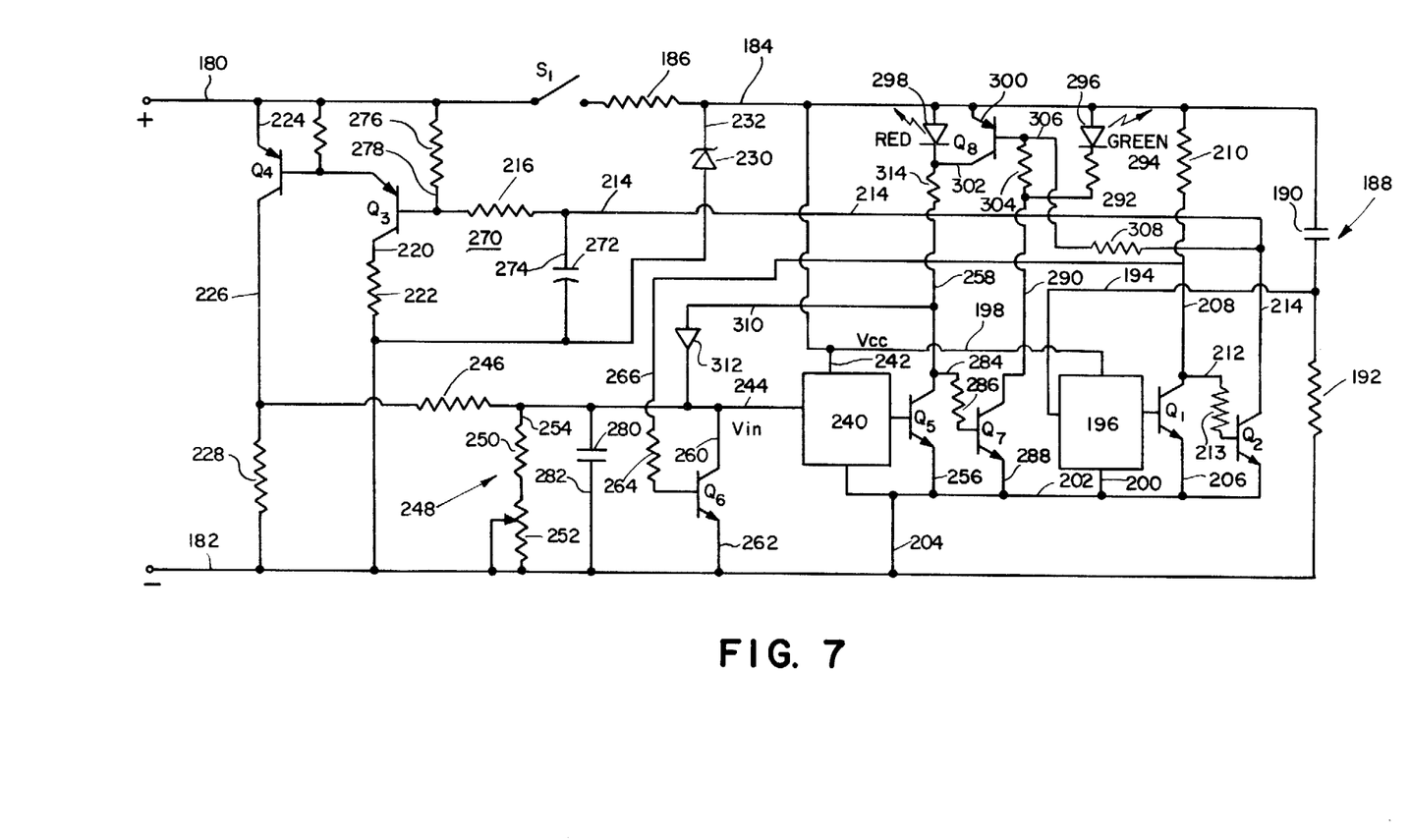
FIG. 7 is a schematic representation of the circuit utilized in performing a battery test evaluation according to the invention.

Referring to FIG. 7 of the drawings, the circuit providing a substantial portion of the logic of the test apparatus is revealed in detail. Operating with this circuit, the test apparatus provides the logic required for battery evaluation utilizing only the power available from the battery being tested. In this regard, a simple voltage regulating function is utilized to assure appropriate operation of the logic features of the circuit. Preferably, a closed circuit voltage (C.C.V.) evaluation is performed inasmuch as such evaluation gives a higher degree of insight as to the expected performance of the battery within the camera environment contemplated. For instance, an evaluation for requisite lower internal impedances to assure camera mounted logic circuit performance is indirectly available. To avoid any deleterious effects on the battery being tested, the C.C.V. load only is applied for a very short interval, for instance about 100 milliseconds. Further, to assure the avoidance of noise aberrations and the like, the entire circuit is not enabled until such time as contact members or probes 114 are stationary and in position on the terminal defining surfaces of the battery. Evaluation of the derived closed circuit voltage is carried out at the termination of the sampling interval through the utilization of threshold response trigger circuits, following which indicators having a low power demand, for instance, light-emitting diodes (L.E.D.) are energized for signaling purposes for as long as the actuator or handle arrangement 94 is maintained in its terminal downward position.

Looking to FIG. 7, the leads extending from each probe as at 114 are represented at 180 and 182. Inasmuch as the battery itself supplies the power to the evaluating circuits, these lines also serve as the main power lead inputs thereto. Line 180 is connected through a switch designated $S_1$, which operates as described in conjunction with microswitch 162 in FIGS. 4, 5, and 6. Switch $S_1$, in turn, is coupled to line 184 through a resistor 186.

Assuming that a composite film-battery package 40 has been inserted within the apparatus and lever assembly 100 has been depressed such that switch $S_1$ is closed and the probes of the assembly are in place upon the terminal defining surfaces of a battery, an R-C timing network, depicted generally at 188, is activated. Formed between lines 184 and 182, network 188 includes capacitor 190 and timing resistor 192 which are "tapped" at their common connection by line 194. Line 194, in turn, is coupled to the input stage of a trigger identified generally at 196. Trigger 196 is of a conventional Schmitt variety having a normally non-conducting input stage and a normally conducting output stage. Upon the insertion of a predetermined input voltage value at its input stage, the trigger reacts to rapidly convert the input stage to a conducting status and the output stage thereof to a non-conducting status. In general application, the trip point for such triggers is specified by a ratio of the input voltage, $V_{in}$ to applied energization voltage $V_{vcc}$, i.e., the ratio $V_{in}/V_{cc}$. In this regard, the energization input to trigger 196 is provided from line 184 and line 198 and the trigger is coupled to line 182 through lines 200, 202, and 204. The output stage of trigger 196 is revealed in detail as an NPN transistor $Q_1$ for purposes of clarifying its interaction with the remainder of the circuit.

The components of R-C network 188 are selected to provide a time constant whereby trigger 196 remains in a tripped state wherein transistor $Q_1$ is off or non-conducting for an interval suited for sampling the closed circuit voltage of the battery being tested from probe leads 180 and 182. This sampling interval may, for instance, be on the order of about 100 milliseconds. The emitter of transistor $Q_1$ is coupled through line 206 to line 202, while its collector is coupled through line 208 and resistor 210 to line 184. Line 208, coupled to the collector electrode of transistor $Q_1$, also is coupled through line 212 to the base of NPN transistor $Q_2$. The emitter of transistor $Q_2$ is connected to line 202, while its collector is coupled through line 214 and base resistor 216 to the base of a PNP transistor $Q_3$. The emitter of transistor $Q_3$, in turn, is coupled to the base of PNP transistor $Q_4$, while its collector is coupled through line 220 and resistor 222 to main lead 182. The emitter of transistor $Q_4$ is coupled through line 224 to power lead 180, while its collector is coupled through line 226 and resistor 228 to power lead 182. With the arrangement shown, when transistor $Q_1$ is in an off status, the base-emitter junction of transistor $Q_2$ is forward biased from line 212 to cause it to assume an on condition. As transistor $Q_2$ conducts, driver transistor $Q_3$ is drawn into conduction to, in turn, draw on power transistor $Q_4$. As power transistor $Q_4$ conducts, the closed circuit load at resistor 228 is applied across the terminals of the battery being tested through leads 180 and 182. This load is applied substantially over the interval determined from R-C timing network 188. Voltage regulation to those portions of the circuit requiring a controlled and predetermined voltage level is provided to line 184 from a Zener diode 230 coupled within line 232 between line 184 and line 198. Note in this regard, that line 198 leading to the trigger functions of the circuits emanates from a voltage control line 184.

The evaluation function of the circuit is carried out utilizing another trigger identified generally at 240. Substantially identical to trigger 196, trigger 240 is present as a Schmitt variety having a controlled voltage energization input at 242 which is coupled in turn, through line 198 to line 184. The trigger, additionally, is coupled to line 182 through lines 202 and 204. The input at line 244 to trigger 240 is connected through resistor 246 of a dividing network, shown generally at 248, to a voltage sampling point in line 226. Network 248 additionally includes resistors 250 and calibrating potentiometer 252 located in line 254. This network is present to adjust the input voltage $V_{in}$ to trigger 240 such that, at a predetermined voltage input level, the ratio $V_{in}/V_{cc}$ will evoke a response tripping the trigger to cause its output stage to assume a non-conducting or off condition. Represented in detail for clarity, the output stage of trigger 240 is shown to be present as an NPN transistor $Q_5$, the emitter of which is coupled through line 256 to line 202 and the collector of which is coupled with line 258. In the event a requisite C.C.V. voltage level is not obtained during a sampling interval, output stage transistor $Q_5$ remains on or in a conducting state.

During the sampling interval regulated by network 188 and trigger 196, the input at line 244 to trigger 240 is held low to retain the trigger in a quiescent state wherein transistor $Q_5$ conducts. This is carried out by a bypass transistor $Q_6$ the collector of which is coupled through line 260 to line 244 and the emitter of which is coupled through line 262 to line 182. The base of transistor $Q_6$ is connected through resistor 264 and line 266 to line 208. Accordingly, transistor $Q_6$ is forwardly biased during such time as transistor $Q_1$ is off, i.e., during the sampling interval established by network 188 and trigger 196.

At the conclusion of the sampling interval, the voltage level at line 194 falls below the trip point of trigger 196. In consequence, transistor $Q_1$ is turned on to, in turn, remove the forward bias at transistor $Q_2$ which turns off. Simultaneously, transistor $Q_6$ turns off to enable the measuring network including trigger 240. To permit trigger 240 to perform its measuring function, however, the removal of forward bias at transistors $Q_3$ and $Q_4$ is delayed by an R-C network identified generally at 270 and including timing capacitor 272 located in line 274 between lines 214 and 232 and a timing resistor 276 located in line 278 between line 180 and line 214. With the turning off of transistor $Q_2$, network 270 serves to provide for continued current draw through driver transistor $Q_3$ for an appropriate interval, for instance, about 100 microseconds. During this interval, trigger 240 is permitted to evaluate the status of the battery as presented it at input line 244. A capacitor 280 coupled within line 282 between lines 244 and 182 is present to eliminate high frequency ringing at the switching off of transistor $Q_6$.

Assuming that a battery meeting the closed circuit voltage test standards has been evaluated at trigger 240, the resultant input thereto at line 244 will cause it to trip, to, in turn, cause output stage transistor $Q_5$ to assume a non-conducting state. The collector side of transistor $Q_5$ is coupled to the base of another NPN transistor $Q_7$ through lines 258, 284 and a resistor 286. The emitter of transistor $Q_7$ is coupled through line 288 to line 202, while its collector is coupled through lines 290, 292, resistor 294 and an indicating light emitting diode 296 to line 184. As labeled in the drawing, L.E.D. 296 may selected emitting, for instance, a green region illumination upon its energization. The forward biasing of the base-emitter junction of transistor $Q_7$ also serves to draw on PNP transistor $Q_8$ to permit sustained conduction at transistor $Q_7$. Transistor $Q_8$ serves as a bypass about another light-emitting diode present in line 258 at 298. Light-emitting diode 298 may be selected to emit illumination in the red region when energized for purposes of indicating a battery of deficient closed circuit voltage characteristics. The diode is isolated, however, by transistor $Q_8$, the emitter of which is coupled through line 300 to line 184, the collector of which is coupled through line 302 to line 258 and the base of which is connected through resistor 304 to line 290 and through line 306 and resistor 308 to line 214 and the collector of transistor $Q_2$. With the arrangement, as transistor $Q_7$ conducts, L.E.D. 296 is energized and L.E.D. 298 is bypassed in consequence of the conductive state extant at transistor $Q_8$.

A continued energization of L.E.D. 296 is provided by a clamping line 310 incorporating a diode 312 and coupled between line 258 and input line 244. Accordingly, as transistor $Q_5$ is turned off, a requisite triggering voltage is maintained through line 310 to input line 244. The circuit maintains the thus described state as long as switch $S_1$ is closed. Note, however, that very little power drain is imposed at the tested battery by those components of the circuit now activated. Upon operator release of lever 94, switch $S_1$ immediately is opened to free the battery from test circuit demands and the circuit is shut down.

Bypass transistor $Q_8$ also is activated during the initial 100 millisecond time-out interval derived from network 188 and trigger 196. Note in this regard, that the base of transistor $Q_8$ is coupled through lines 306 and 214 to the collector of transistor $Q_2$. During the initial sampling interval, transistor $Q_2$ is on to, in turn, draw transistor $Q_8$ on to assert the noted bypass function thereof. As a consequence, no red L.E.D. blinking effect or the like will be occasioned upon initial engagement of the probes as at 114 with the terminal defining surfaces of the battery of package 40. Bypass transistor $Q_8$, when activated during the illumination of L.E.D. 296, additionally serves the function of eliminating low level glow at red L.E.D. 298. Note, for instance, that an undesirable circuit path may otherwise extend through resistor 314 and line 258, through line 284 and resistor 286, and through the base-emitter junction of $Q_7$.

In the event a battery is encountered which does not meet requisite threshold C.C.V. voltage standards, trigger 240 will not trip and transistor $Q_5$ will remain in a conductive state to, in turn, withhold forward bias at the base-emitter junction of transistor $Q_7$. In consequence, with the removal of forward bias at transistor $Q_8$, red L.E.D. 298 is energized through line 258 and the output stage including transistor $Q_5$ of trigger 240.

Where additional storage of the film package following testing according to the instant invention is contemplated, the small punctures made in the inner hermetic seal 49 may be resealed. Such resealing will provide protection against humidity excursions and like phenomena. Sealing may be carried out by the simple expedient of opening an outer cardboard flap of the package and covering the punctures with an appropriate adhesively adhering tape. Alternately, the seal itself may be formed incorporating a self-sealing elastomer, for instance, a tacky or soft rubber polymer having a low second order transition point.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for evaluating a battery having output terminals of opposed polarity comprising:

contact means for providing electrical communication with said terminals;

load means exhibiting an impedance of predetermined value connectable across said terminals to derive a closed circuit voltage value of said battery;

load switching means actuable to assume a first state applying said load across said terminals through said contact means and a second state electrically isolating said load from said terminals;

evaluating means responsive, when enabled, to said voltage value at said load means exhibiting at least a predetermined value and having a first output condition responsive thereto;

timing means for selectively enabling said evaluating means and responsive to said contact means electrical communication with said terminals for actuating said load switching means to sequentially assume said first and second states to define an interval of sampling for deriving said voltage value; and indicator means responsive to said evaluating means first output condition for indicating the presence thereof.

2. The apparatus of claim 1 wherein said load switching means, said timing means, said evaluating means and said indicator means are energizable from said battery through said contact means.

3. The apparatus of claim 1 wherein said contact means includes a switch configured to enable said apparatus to evaluate a said battery only when said electrical communication with said terminals is stable.

4. The apparatus of claim 1 in which said timing means is configured to enable said evaluating means substantially when said load switching means is actuated to assume said second state.

5. The apparatus of claim 1 in which:

said evaluating means exhibits a second output condition in response to said derived voltage having a value less than said predetermined value; and said indicator means is responsive to said evaluating means second output condition for indicating the presence thereof.

6. The apparatus of claim 1 in which said timing means is configured to enable said evaluating means at the termination of an interval substantially corresponding with said sampling interval, and to actuate said load switching means to assume said second state at the termination of a short finite interval commencing with the said enablement of said evaluating means.

7. The apparatus of claim 1 in which:

said load switching means, said timing means, said evaluating means and said indicator means are energizable from said battery through said contact means, and including voltage regulator means for regulating the voltage value of said energization of said timing means and said indicator means.

8. The apparatus of claim 1 in which said indicator means includes a light emitting diode.

9. The apparatus of claim 1 in which:

said load switching means, said timing means, said evaluating means, and said indicator means are energizable from said battery through said contact means; and said contact means includes a switch configured to enable said apparatus to evaluate a said battery only when the electrical communication at said terminals is stable.

10. The apparatus of claim 9 in which said timing means is configured to enable said evaluating means at the termination of an interval substantially corresponding with said sampling interval, and to actuate said load switching means to assume said second state at the termination of a short finite interval commencing with the said enablement of said evaluating means.

11. The apparatus of claim 9 in which:

said evaluating means exhibits a second output condition in response to said derived voltage having a value less than said predetermined value; and said indicator means is responsive to said evaluating means second output condition for indicating the presence thereof.

12. The apparatus of claim 9 including voltage regulator means for regulating the voltage value of said energization for said timing means and said indicator means.

13. The apparatus of claim 1 in which:

said timing means is configured to enable said evaluating means at the termination of an interval substantially corresponding with said sampling interval, and to actuate said load switching means to assume said second state at the termination of a short interval commencing with the said enablement of said evaluating means; and said load switching means, said timing means, said evaluating means, and said indicator means are energizable from said battery through said contact means, and including voltage regulator means for regulating the voltage value of said energization for said timing means and said indicator means.

14. The apparatus of claim 13 in which:

said evaluating means exhibits a second output condition in response to said derived voltage having a value less than said predetermined value; and said indicator means is responsive to said evaluating means second output condition for perceptibly indicating the presence thereof.

15. Apparatus for testing the condition of a battery located within a multiwalled package, said battery having spaced terminal defining surfaces of opposed polarity in predetermined orientations within said package, comprising:

probe means insertable through a select wall of said package for establishing electrically conducting contact with said terminal surfaces;

receiver means for removably receiving said package in a predetermined orientation aligning said select wall for said probe means insertion;

actuator means including a carriage assembly actuable to provide relative movement between said package and said probe means and having a motion limiting orientation when said probe means conducting contact is made;

test circuit means, energizable from said battery through said probe means, for determining, within a predetermined limited sampling interval commencing with said contact means actuation, the presence of a closed circuit voltage of said battery having a value at least equal to a predetermined value and having a select output condition when said voltage value is derived during said interval;

switch means actuable to enable said test circuit means by energization from said battery when said carriage assembly assumes said motion limiting orientation; and indicator means energizable from said battery through said contact means in the presence of said select output condition.

16. The apparatus of claim 15 wherein said sampling interval is selected as about 100 milliseconds.

17. The apparatus of claim 15 in which said test circuit means comprises timing means energizable when said switch means is actuated and said probe means electrical conducting contact is effected for substantially determining said predetermined limited sampling interval; and evaluating means responsive to the said closed circuit voltage value of said battery for deriving said select output condition when said voltage value is equal to or greater than said predetermined value.

* * * * *